(12) United States Patent
Janitch et al.

(10) Patent No.: US 7,466,124 B2
(45) Date of Patent: Dec. 16, 2008

(54) MAGNETOSTRICTIVE TRANSMITTER WITH IMPROVED PIEZOELECTRIC SENSOR

(75) Inventors: Paul G. Janitch, Lisle, IL (US); Timothy S. Sussman, Bolingbrook, IL (US)

(73) Assignee: Magnetrol International, Inc., Downers Grove, IL (US)

( * ) Notice: Subject to any disclaimer, the term of this patent is extended or adjusted under 35 U.S.C. 154(b) by 0 days.

(21) Appl. No.: 11/517,866

(22) Filed: Sep. 8, 2006

(65) Prior Publication Data

US 2008/0061772 A1    Mar. 13, 2008

(51) Int. Cl.
G01B 7/14 (2006.01)
G01R 33/18 (2006.01)

(52) U.S. Cl. .................... 324/207.13; 324/207.24; 333/148

(58) Field of Classification Search .......... 324/260–263, 324/244, 207.13, 207.24, 207.26, 209; 367/118; 73/290 R, 314, 618, 627, 632, 861.08, 861.18; 310/333–334, 367–369, 311, 323.06; 333/148
See application file for complete search history.

(56) References Cited

U.S. PATENT DOCUMENTS

| 4,943,773 | A | * | 7/1990 | Koski et al. ............ 324/207.13 |
|---|---|---|---|---|
| 5,136,884 | A | | 8/1992 | Lovett |
| 5,473,245 | A | | 12/1995 | Silvus, Jr. et al. |
| 5,545,984 | A | | 8/1996 | Gloden et al. |
| 5,590,091 | A | | 12/1996 | Gloden et al. |
| 5,640,880 | A | | 6/1997 | Mulrooney et al. |
| 5,804,961 | A | | 9/1998 | Castillo et al. |
| 2004/0060767 | A1 | | 4/2004 | Nguyen et al. |
| 2006/0198247 | A1 | * | 9/2006 | Purcell et al. ............... 367/163 |

* cited by examiner

*Primary Examiner*—Bot LeDynh
(74) *Attorney, Agent, or Firm*—Wood, Phillips, Katz, Clark & Mortimer

(57) ABSTRACT

A magnetostrictive level sensing instrument is used for sensing level in a process vessel and comprises an elongate tube having a near end and a distal end. A magnet is selectively positionable proximate the tube responsive to level of the processed material. A magnetostrictive wire in the tube has first and second ends. The second end is operatively secured at the tube distal end. A pair of shear mode crystals are mounted proximate the tube near end. The crystals sandwich the magnetostrictive wire proximate the first end. A sensing circuit is operatively connected to the magnetostrictive wire and the pair of crystals for generating an electrical pulse on the magnetostrictive wire whereby a magnetic field produced by the magnet interacts with the electrical pulse to produce a torsional wave on the magnetostrictive wire sensed by the pair of crystals.

8 Claims, 4 Drawing Sheets

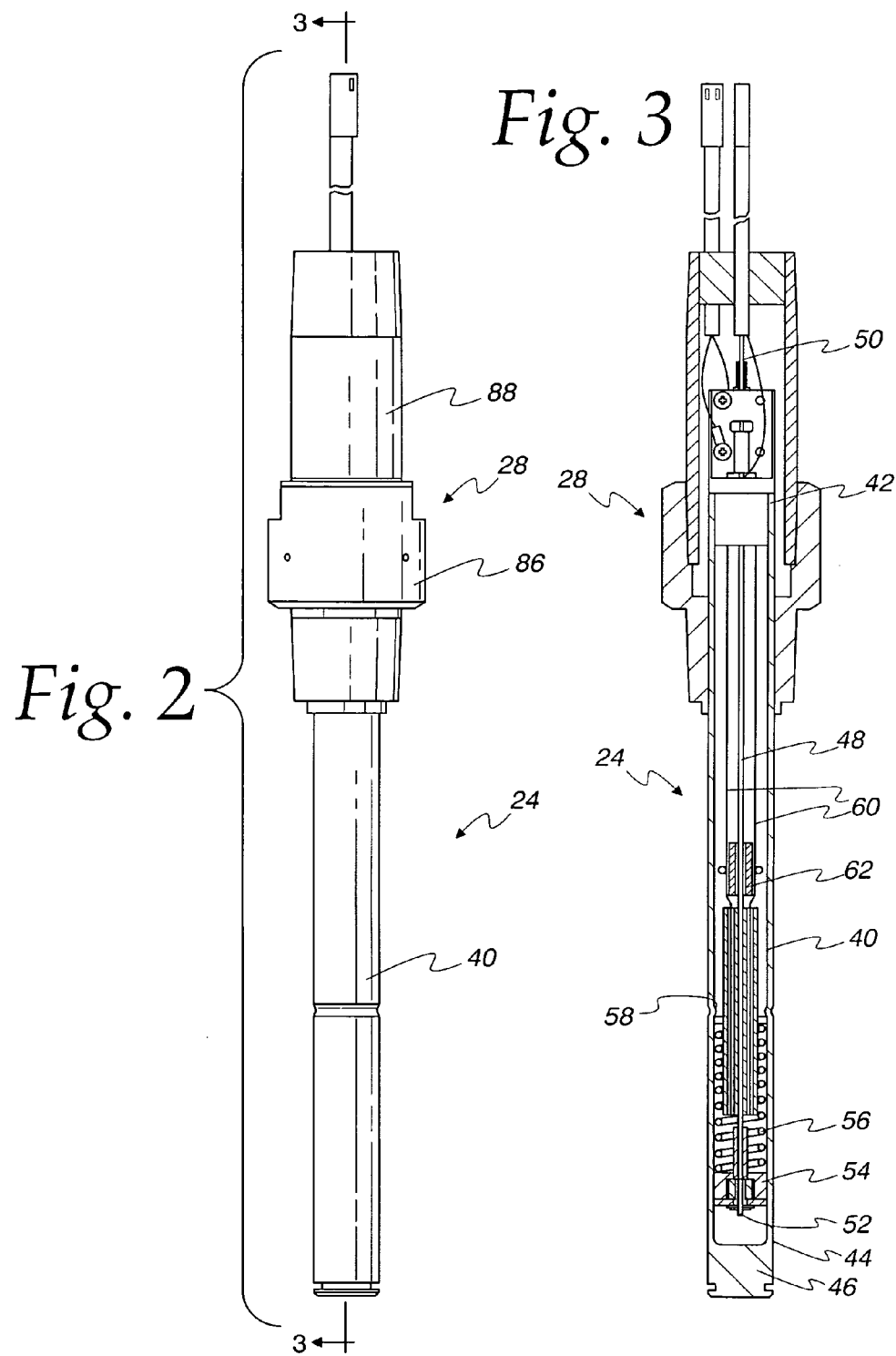

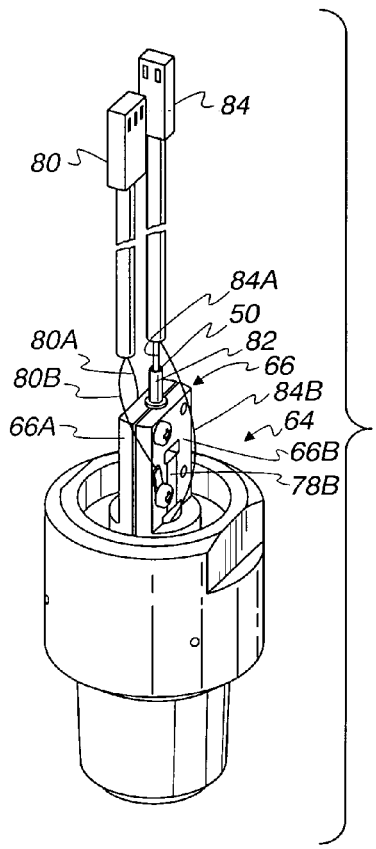
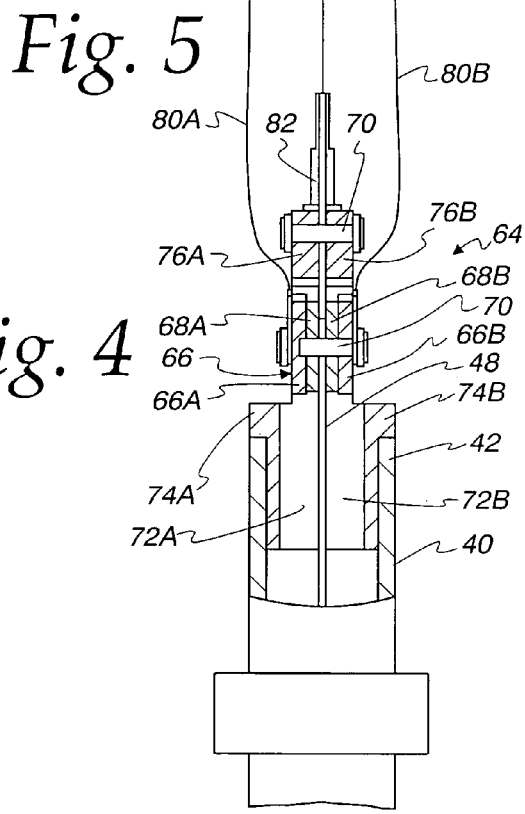
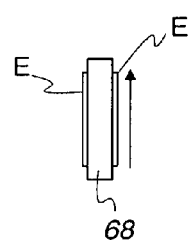
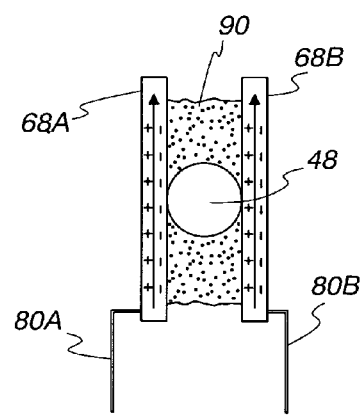
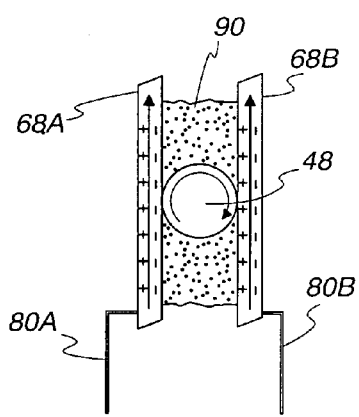
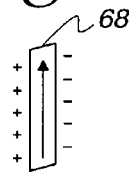

MAGNETOSTRICTIVE TRANSMITTER WITH IMPROVED PIEZOELECTRIC SENSOR

CROSS REFERENCE TO RELATED APPLICATIONS

There are no related applications.

FIELD OF THE INVENTION

The present invention relates to magnetostrictive level sensing instruments and, more particularly, to an improved piezoelectric position sensor.

BACKGROUND OF THE INVENTION

Sensing instruments are used for sensing various different process variables, such as level of a process fluid or material in a process vessel. Many such instruments are of the intrusive type in which a sensing apparatus is exposed to the process fluid for sensing level. One such type of intrusive sensor comprises a magnetostrictive sensor. A magnetostrictive sensor has a probe including a magnetostrictive wire maintained under tension in a tube. The probe extends into the process vessel. A magnetic float is movable proximate the probe and floats atop the fluid in the vessel. An electrical pulse is transmitted on the magnetostrictive wire. The electrical pulse interacts with the magnetic field of the float, which creates a torque on the wire to produce a torsional force on the wire, thus initiating a torsional wave that propagates along the wire at the speed of sound. Typically, a pick up sensor is positioned at one end of the wire to sense the torsional wave on the wire. The elapsed time is measured between the launch of the electrical pulse and the signal from the pick up sensor. The distance between the magnet and the pick-up sensor is calculated from the measured lapsed time multiplied by the speed of the torsional wave, representing level.

Known magnetostrictive measurement instruments use piezoelectric crystals as a pick up sensor. Such piezoelectric crystals are generally polarized in the longitudinal direction, referred to as the K33 coupling direction in the field of electro-ceramics. One form of position sensors uses two K33 polarized crystals mounted perpendicular to one another extending radially from the wire so that a tensile load from the torsional wire is sensed at an edge of the crystals. In this arrangement, the tensile or compressive load on each crystal due to the torsional displacement of the wire acts on only one edge of the crystal. This can result in a noisy and low amplitude signal. Such an arrangement is sensitive to the position of the crystals and requires fine adjustments and tuning, making it difficult to manufacture. Such a sensor may falsely detect spurious vibrations in a magnetostrictive wire.

In another form of position sensor, a number of wedge shaped piezoelectric crystals are arranged in a circular array and are bonded between a metallic inner ring and a metallic outer ring using an electrically conductive adhesive. The symmetry of such a crystal array can cancel out spurious noise effects due to random vibration. However, the high number of specialized crystals required to build such an assembly make it expensive. Moreover, the inner and outer masses and bonding steps add to the total cost.

The present invention is directed to improvements in piezoelectric position sensors.

SUMMARY OF THE INVENTION

In accordance with the invention, there is provided a magnetostrictive sensing instrument with an improved magnetostrictive position sensor.

Broadly, there is disclosed in accordance with one aspect of the invention a position sensor in a magnetostrictive sensing instrument for sensing location of a magnetic field. An elongate tube has a near end and a distal end. A magnetostrictive wire in the tube has first and second ends. The second end is operatively secured at the tube distal end. The position sensor comprises a pair of shear mode crystals mounted proximate the tube near end. The crystals sandwich the magnetostrictive wire proximate the first end so that interaction between an electric pulse on the magnetostrictive wire and a magnetic field produces a torsional wave on the magnetostrictive wire sensed by the pair of crystals.

It is a feature of the invention that the crystals are polarized in a K15 coupling direction.

It is another feature of the invention that the crystals are electrically connected by the magnetostrictive wire creating a differential electrical response.

It is a further feature of the invention to provide a support tray mounting the crystals proximate the tube near end and the tray clamps the magnetostrictive wire between the crystals.

It is still another feature of the invention that the support tray maintains the magnetostrictive wire in tension.

There is disclosed in accordance with another aspect of the invention a magnetostrictive level sensing instrument for sensing level in a process vessel comprising an elongate tube having a near end and a distal end. A magnet is selectively positionable proximate the tube responsive to level of the processed material. A magnetostrictive wire in the tube has first and second ends. The second end is operatively secured at the tube distal end. A pair of shear mode crystals are mounted proximate the tube near end. The crystals sandwich the magnetostrictive wire proximate the first end. A sensing circuit is operatively connected to the magnetostrictive wire and the pair of crystals for generating an electrical pulse on the magnetostrictive wire whereby a magnetic field produced by the magnet interacts with the electrical pulse to produce a torsional wave on the magnetostrictive wire sensed by the pair of crystals.

It is a feature of the invention that the support tray comprises a two piece plastic tray and each piece supports one of the crystals. The two tray pieces may be secured together with threaded fasteners to clamp the magnetostrictive wire between the crystals.

It is a further feature of the invention to provide a compression spring securing the magnetostrictive wire second end to the tube distal end.

It is still another feature of the invention to provide a process connector secured to the tube near end for mounting the instrument to a process vessel.

It is still a further feature of the invention to provide a conductive adhesive filling between the pair of crystals.

There is disclosed in accordance with a further aspect of the invention the method of assembling a position sensor for a magnetostrictive sensing instrument comprising providing an elongate tube having a near end and a distal end; inserting a magnetostrictive wire having first and second ends into the tube and securing the second end at the tube distal end; tensioning the magnetostrictive wire by applying a force proximate the first end; mounting a support tray at the tube second end, the support tray supporting a pair of crystals sandwiching the magnetostrictive wire; clamping the crystals to the magnetostrictive wire to maintain the wire under tension; and removing excess magnetostrictive wire between the support tray and the first end.

Further features and advantages of the invention will be readily apparent from the specification and from the drawings.

BRIEF DESCRIPTION OF THE DRAWINGS

FIG. 2 is an elevation view of a probe of the instrument of FIG. 1;

FIG. 3 is a sectional view taken along the line 3-3 of FIG. 2;

FIG. 4 is a partial perspective view of the probe of FIG. 2 with parts removed for clarity to illustrate a position sensor in accordance with the invention;

FIG. 5 is an elevation view for the upper end of the position sensor shown in FIG. 4, with parts shown in section;

FIGS. 6 and 7 illustrate properties of a shear mode crystal used in the position sensor in accordance with the invention;

FIG. 8a is a generalized plan view illustrating static relationship between the magnetostrictive wire and shear mode crystals in accordance with the invention;

FIG. 8b is a generalized view, similar to FIG. 8a, illustrating a crystal response to a torsional wave in the magnetostrictive wire;

DETAILED DESCRIPTION OF THE INVENTION

Figure 1:
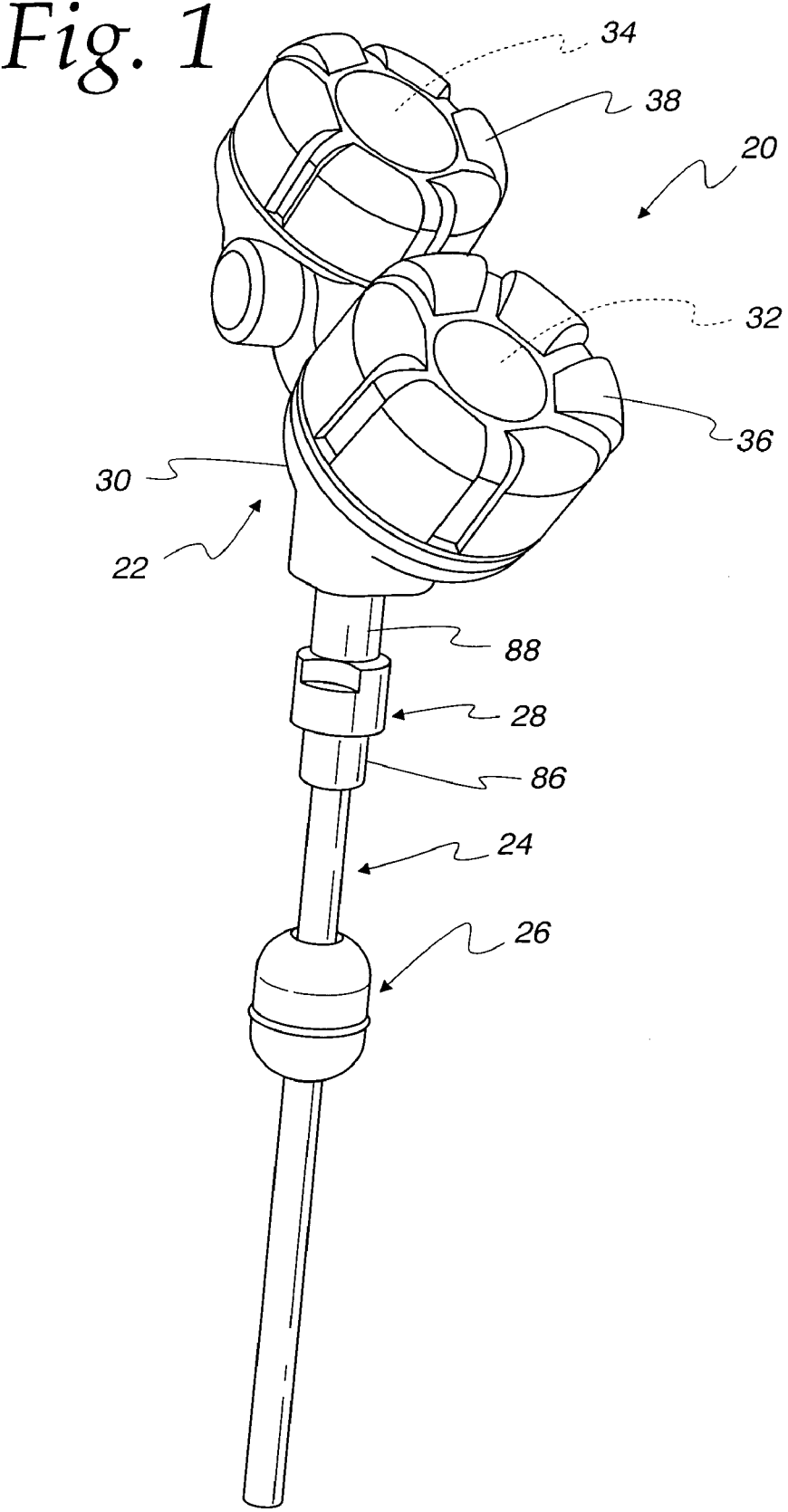
FIG. 1 is a perspective view of a magnetostrictive sensing instrument in accordance with the invention.

Referring to FIG. 1, a magnetostrictive level sensing instrument in the form of a transmitter 20 is illustrated. The transmitter 20 is operable to sense level of a material, such as a fluid in a process vessel, and transmit an electrical signal indicative of the level to control instrumentation.

The transmitter 20 includes a control housing 22, a probe 24, a float 26 and a connector 28 connecting the probe 24 to the housing 22. The housing 22 comprises a dual compartment instrument housing as described in Mulrooney et al. U.S. Pat. No. 6,062,095. The housing 22 includes a base assembly 30 to define an electronics compartment 32 and a wiring compartment 34 selectively closed by covers 36 and 38, respectively. The electronics compartment 32 houses a sensing circuit, described below, for determining level and generating the electrical signal representing level for transmission to other control instruments, as is well known.

The float 26 comprises a magnetic float captured on the probe 24. As is known, the float 26 floats atop the material the level of which is being sensed and creates a magnetic field representative of the location of the top surface of the fluid or other material.

Referring to FIGS. 2 and 3, the probe 24 comprises an elongate stainless steel tube 40 having a near end 42 and a distal end 44. The distal end 44 is closed by an end cap 46. A magnetostrictive wire 48 has a first end 50 and a second end 52. The wire second end 52 is secured to a wire end fixture 54 located proximate the tube distal end 44. A compression spring 56 extends between the fixture 54 and a radial notch 58 in an inner wall of the tube 40 spaced from the distal end 44. Sensor return wires 60 are connected to the magnetostrictive wire 48 proximate its second end 52 to provide a signal return.

Appropriate spacers 62 maintain proper spaced relationship between the magnetostrictive wire 48, the return wires 60 and the tube 40.

Referring to FIGS. 3-5, a position sensor 64 is mounted at the tube near end 42. The position sensor 64 comprises a two piece support tray 66 having a first tray piece 66A and a second tray piece 66B. The tray pieces 66A and 66B are mirror images of one another. As such, the elements of each are referenced in the drawings with like reference numerals with suffixes A and B. The tray pieces 66A and 66B support respective first and second crystals 68A and 68B. The tray pieces 66A and 66B are secured together with threaded fasteners 70.

The first tray piece 66A comprises a semi-cylindrical neck 72A having a radially outwardly extending shoulder 74A. A plate 76A extends upwardly from the shoulder 74A. The second tray piece 66B is identical in construction. The outer diameter of the joined neck pieces 72A and 72B is of a size so that the support tray 66 is telescopically received in the tube 40 with the shoulders 74A and 74B resting on the tube near end 42, as illustrated in FIG. 5. The crystals 68A and 68B are disposed between the plates 76A and 76B sandwiching the magnetostrictive wire 48 therebetween, as also illustrated in FIG. 5. The threaded fasteners 70 secure the tray pieces 66A and 66B together with the crystals 68A and 68B clamping the magnetostrictive wire 48.

Figure 9:
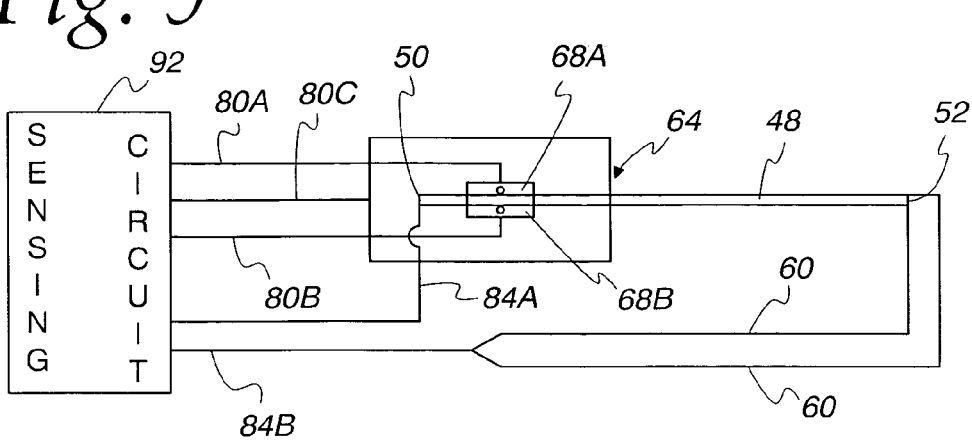
FIG. 9 is an electrical schematic for the instrument of FIG. 1.

With reference particularly to FIG. 4, a copper foil 78B is illustrated which wraps around a portion of the plate 76B. The copper foil 78B provides an electrical connection between the second crystal 68B and an electrical wire 80B of a wiring assembly 80. Another electrical wire 80A is similarly electrically connected to the first crystal 68A. The wires 80A and 80B may wrap around the fasteners 70 for strain relief. A shield 80C, see FIG. 9, of the wiring assembly 80 is electrically connected to the conductive surface of shrink tubing (not shown) of the position sensor 64. The magnetostrictive wire first end 50 extends outwardly of a brass tube 82 seated atop the support tray 66. The wire first end 50 connects to a first electrical wire 84A of a second wiring assembly 84. A second electrical wire 84B connects to the return wires 60, as shown in FIG. 9.

Referring again to FIGS. 2 and 3, the process connector 28 comprises an adaptor 86 secured to the tube 40 by any known means for threadably connecting the probe 24 to a process vessel, as is well known. Alternatively, a mounting flange could be provided. A nipple 88 is threadably connected between the adaptor 86 and the housing 22, see FIG. 1.

In accordance with the invention, the probe 24 uses the position sensor 64 which employs the two piezoelectric crystals 68A and 68B clamped to the magnetostrictive wire 48 such that the crystal polarization and coupling mode is optimized for sensing a torsional wave in the wire 48. The disclosed embodiment uses two crystals 68A and 68B polarized in the thickness shear mode, referred to as the K15 coupling direction. The properties of the crystals 68 are illustrated in FIGS. 6 and 7. (For simplicity, discussion common to both crystals references the crystal without the suffix A or B.) The polling direction of the crystal 68 is illustrated by an arrow in FIG. 6. Particularly, during polling, polling electrodes are provided at opposite ends, represented by opposite ends of the arrow. Thereafter, electrodes E are provided on opposite surfaces of the crystal 68 resulting in mechanical shear. Strain with an electrical voltage applied, as illustrated in FIG. 7, shows the deflection produced by the crystal 68 between the electrodes E, see FIG. 6.

In the illustrated embodiment of the invention, the crystals 68A and 68B have an optimal polar direction with respect to the torsional deflection of the wire 48. The torsional wave of the wire imparts a shear force on the crystals 68, producing the strained shape shown in FIG. 7. As described above, the support tray 66 supports the crystals 68A and 68B sandwiching the magnetostrictive wire 48, as shown in FIG. 8a. The magnetostrictive wire 48 is conductive. Therefore, a conductive path exists from the first sensor wire 80A through the first crystal 68A, the magnetostrictive wire 48, the second crystal 68B, and the second sensor wire 80B. As such, the differential electrical response of the crystals are differentially amplified. This results in an efficient position sensor 64 with high signal amplitude and low noise. The position sensor 64 is not sensitive to vibration because the responses of the two crystals 68A and 68B to the shear components of any translational load cancel out. Moreover, because the crystals 68A and 68B clamp the magnetostrictive wire 48, to maintain it in tension, there is no need for damping materials.

As described, each crystal 68 is mounted to the plastic support tray 66. A conductive adhesive may be used. The support tray 66 performs a plurality of functions. The support tray 66 holds the crystals 68A and 68B in contact with the magnetostrictive wire 48. Pressure is applied to the wire 48 by clamping the two tray pieces 66A and 66B together with the fasteners 70. The support tray 66 mounts on the near end 42 of the guide tube 40 and is held in place by tension in the wire 48 without the use of additional hardware. Additionally, the support tray 66 provides electrical isolation between the crystals 68A and 68B and the guide tube 40.

With reference again to FIG. 8a, the gap between the crystals 68A and 68B may be filled with a conductive adhesive 90 for robustness and enhanced mechanical coupling to the magnetostrictive wire 48. As shown in FIG. 8b, a torsional wave on the wire 48 produces a strained shape on the crystals 68A and 68B, as illustrated, to produce the differential electrical response across the electrical wires 80A and 80B.

This sensor assembly 64 consists of few parts, namely the two crystals 68A and 68B and two tray pieces 66A and 66B, and fasteners 70, providing a low cost, easy to manufacture assembly which provides a quality signal.

Referring to FIG. 9, a sensing circuit 92 is electrically connected to the conductors 80A, 80B, 84A and 84B. Polarity direction of each crystal 68A and 68B, which is out of the drawing sheet, is represented by a dot. The sensing circuit 92 is conventional in design and function. The sensing circuit 92 is operable to generate an electrical pulse on the electrical wire 84A that is launched along the magnetostrictive wire 48 from the first end 50 to the second end 52. The electrical pulse interacts with the permanent magnet of the float 26 that is located in close proximity to the wire 48 and at the precise position to be measured. The interaction between the electrical pulse on the wire and the magnetic field produces a torsional force on the wire 48, thus initiating a torsional wave that propagates along the magnetostrictive wire 48 at the speed of sound. The crystals 68A and 68B sense the torsional wave in the wire 48 and provide a differential signal on the electrical wires 80A and 80B to the sensing circuit 92 which measures elapsed time between launch of the electrical pulse and the return signal from the crystals 68A and 68B. The distance between the magnet 26 and the position sensor 64 is calculated from the measured elapsed time multiplied by the speed of the torsional wave.

Figure 10:
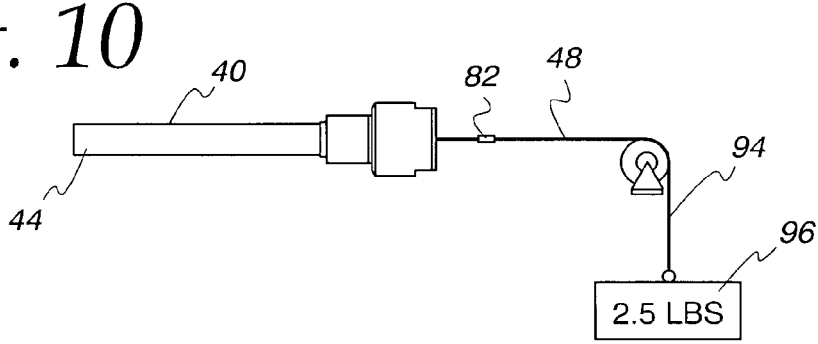
FIGS. 10-12 illustrate the method of assembling the probe for the magnetostrictive sensing instrument of FIG. 1 in accordance with the invention.
Figure 11:
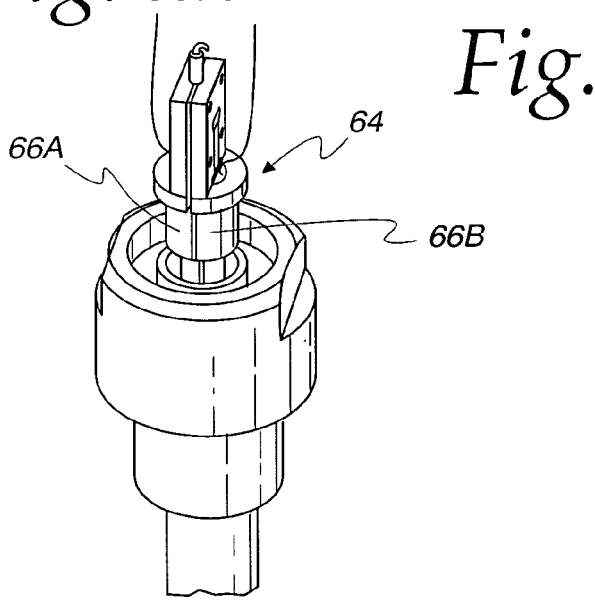
Figure 12:
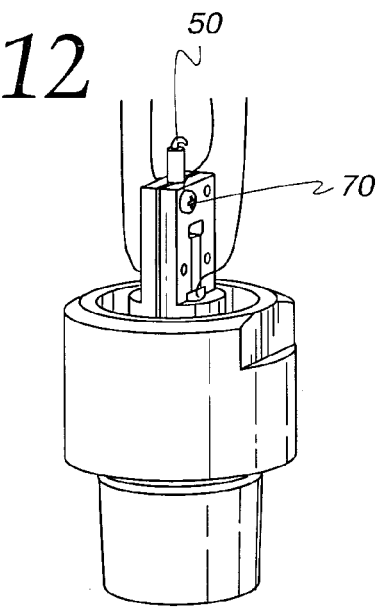

The illustrated probe 24 can be assembled in substantially shorter time than conventional magnetostrictive probes. The assembly process is illustrated in FIGS. 10-12. During initial stages of assembly, the magnetostrictive wire 48 is inserted lengthwise into the guide tube 40 with the wire second end 48 securing to the tube distal end 44, as described above and illustrated in FIG. 3. The brass tube 82 is placed over the wire 48. With the tube 40 horizontal, a string pulley system 94 is used to tension the wire 48 with a 2.5 lb. or the like dead weight 96. Any coating on the wire 48 where it exits the tube 40 may be ground off. Thereafter, the position sensor 64 is assembled by placing the tray pieces 66A and 66B, with the crystals 68A and 68B contained therein, over the wire 48, as shown in FIG. 11. The fasteners 70 are then inserted, as shown in FIG. 12, to clamp the crystals 68A and 68B to the wire 48, as shown, for example, in FIG. 5. Thereafter the excess magnetostrictive wire is removed to expose the described first end 50 which is bent to form a hook and thereafter secured to the conductor 84A, as described previously.

As is apparent, there will be additional assembly procedures that are not described herein as such steps are well known and conventional in nature.

Thus, there is described an improved method of assembling a position sensor for a magnetostrictive sensing instrument as well as an improved position sensor. The magnetostrictive sensing instrument is described particularly in an application for sensing level of a fluid or other material in a process vessel or the like. The magnetostrictive sensing instrument may be used for sensing parameters other than level. Particularly, the magnetostrictive instrument is used for sensing the location of a magnetic field along the length of the magnetostrictive wire. As such, the instrument serves more generally as a position or location sensor with a typical position representing level of a fluid or other material in a vessel.

I claim:

1. A magnetostrictive level sensing instrument for sensing level of a process material comprising:

an elongate tube having a near end and a distal end;

a magnet selectively positionable proximate the tube responsive to level of the process material;

a magnetostrictive wire in the tube having first and second ends, the second end being operatively secured at the tube distal end;

a pair of shear mode crystals mounted proximate the tube near end, the crystals sandwiching the magnetostrictive wire proximate the first end;

a sensing circuit operatively connected to the magnetostrictive wire and the pair of crystals for generating an electrical pulse on the magnetostrictive wire whereby a magnetic field produced by the magnet interacts with the electrical pulse to produce a torsional wave on the magnetostrictive wire sensed by the pair of crystals; and a support tray mounting the crystals proximate the tube near end and the tray clamps the magnetostrictive wire between the crystals, wherein the support tray comprises a two piece plastic tray and each piece supports one of the crystals.

2. The magnetostrictive level sensing instrument of claim 1 wherein the two tray pieces are secured together with threaded fasteners to clamp the magnetostrictive wire between the crystals.

3. A magnetostrictive level sensing instrument for sensing level of a process material comprising:

an elongate tube having a near end and a distal end;

a magnet selectively positionable proximate the tube responsive to level of the process material;

a magnetostrictive wire in the tube having first and second ends, the second end being operatively secured at the tube distal end;

a pair of shear mode crystals mounted proximate the tube near end, the crystals sandwiching the magnetostrictive wire proximate the first end; and a sensing circuit operatively connected to the magnetostrictive wire and the pair of crystals for generating an electrical pulse on the magnetostrictive wire whereby a magnetic field produced by the magnet interacts with the electrical pulse to produce a torsional wave on the magnetostrictive wire sensed by the pair of crystals, further comprising a conductive adhesive filling between the pair of crystals.

4. The method of assembling a position sensor for a magnetostrictive sensing instrument comprising:

providing an elongate tube having a near end and a distal end;

inserting a magnetostrictive wire having first and second ends into the tube and securing the second end at the tube distal end;

tensioning the magnetostrictive wire by applying a force proximate the first end;

mounting a support tray at the tube second end, the support tray supporting a pair of crystals sandwiching the magnetostrictive wire;

clamping the crystals to the magnetostrictive wire to maintain the wire under tension; and removing excess magnetostrictive wire between the support tray and the first end.

5. The method of claim 4 further comprising polarizing the crystals in the shear mode.

6. The method of claim 4 further comprising securing the a magnetostrictive wire second end to the tube distal end using a compression spring.

7. The method of claim 4 wherein the support tray comprises a two piece plastic tray and each of the crystals is placed in one of the tray pieces.

8. The method of claim 4 further comprising filling a gap between the pair of crystals with a conductive adhesive.

* * * * *